United States Patent [19]

Artzberger

[11] 4,091,488
[45] May 30, 1978

[54] DOCKBOARD UTILIZING A GAS SPRING FOR COUNTERBALANCING

[75] Inventor: Thomas G. Artzberger, Menomonee Falls, Wis.

[73] Assignee: Kelley Company Inc., Milwaukee, Wis.

[21] Appl. No.: 758,666

[22] Filed: Jan. 12, 1977

[51] Int. Cl.² ............................................. E01D 1/00
[52] U.S. Cl. .................... 14/71.7; 92/181 P; 267/65 R
[58] Field of Search .............................. 14/71.3, 71.7; 91/181 R, 181 P; 91/416; 60/632, 636, 637, 282, 269; 188/317, 282, 269; 267/65 R, 124

[56] References Cited

U.S. PATENT DOCUMENTS

| | | | |
|---|---|---|---|
| 3,137,017 | 6/1964 | Pfleger | 14/71.3 |
| 3,203,002 | 8/1965 | McGuire | 14/71.3 |
| 3,249,956 | 5/1966 | Zajac | 14/71.3 |
| 3,345,665 | 10/1967 | Anderson | 14/71.7 |
| 3,388,413 | 6/1968 | Clarke | 14/71.7 |
| 3,415,159 | 12/1968 | Hornlein | 92/134 X |
| 3,646,627 | 3/1972 | Potter | 14/71.3 |
| 3,835,497 | 9/1974 | Smith | 14/71.3 |
| 3,963,225 | 6/1976 | Nicholls | 267/65 R |
| 3,966,182 | 6/1976 | Stadelmann | 267/65 R |
| 4,014,059 | 3/1977 | Artzberger | 14/71.3 |

Primary Examiner—Nile C. Byers
Attorney, Agent, or Firm—Andrus, Sceales, Starke & Sawall

[57] ABSTRACT

An adjustable dockboard utilizing a gas spring for counterbalancing action. The dockboard includes a ramp hinged at its rear edge to the supporting structure or frame and a lip is hinged to the forward edge of the ramp and is movable between a downwardly hanging pendant position and an extended position. The ramp is counterbalanced to an upwardly inclined position by a gas spring assembly which interconnects the frame and the ramp. The gas spring assembly comprises a closed cylinder-piston structure in which the cylinder contains a gas, such as nitrogen, and a quantity of a liquid, such as oil. When the ramp is in the horizontal position, the piston is retracted in the cylinder and due to the differential in the magnitude of the forces acting on opposite sides of the piston, a biasing action is achieved which urges the piston rod to an extended position and moves the ramp to the upwardly inclined position. Associated with the gas spring assembly is a uni-directional holddown mechanism which prevents extension of the piston rod unless manually released. By incorporating a bleed-through orifice in the piston, a damping action is achieved at the ends of the stroke of the piston. A similar gas spring assembly can also be connected to the lip to assist in moving the lip from the pendant to the extended position.

15 Claims, 7 Drawing Figures

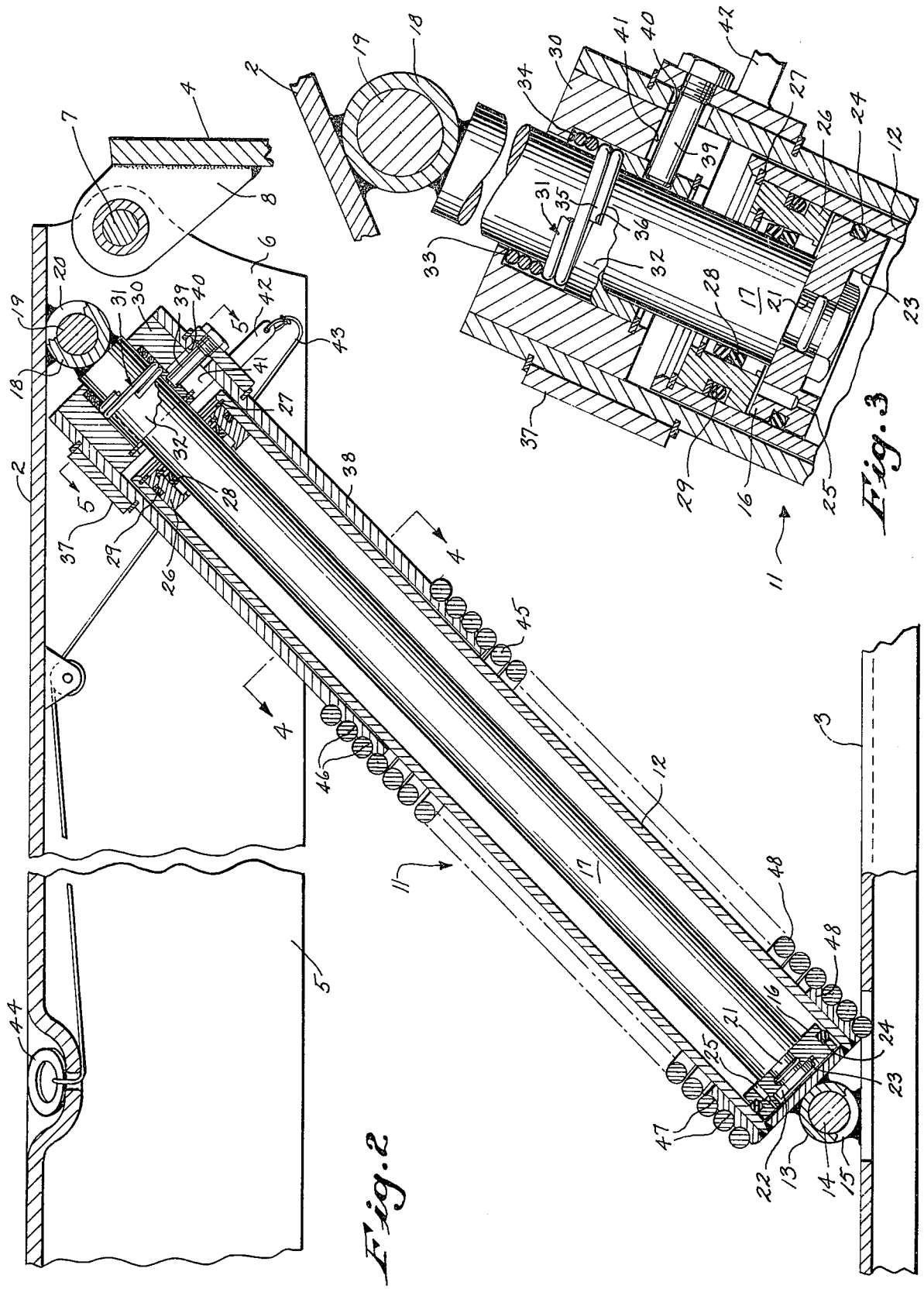

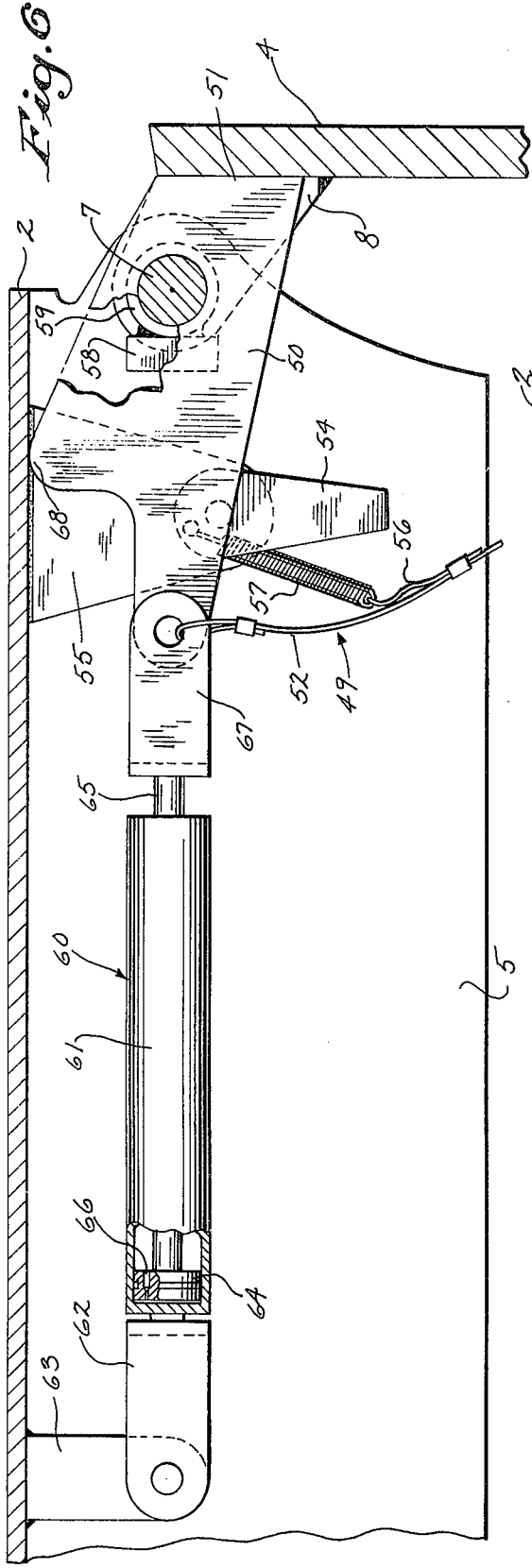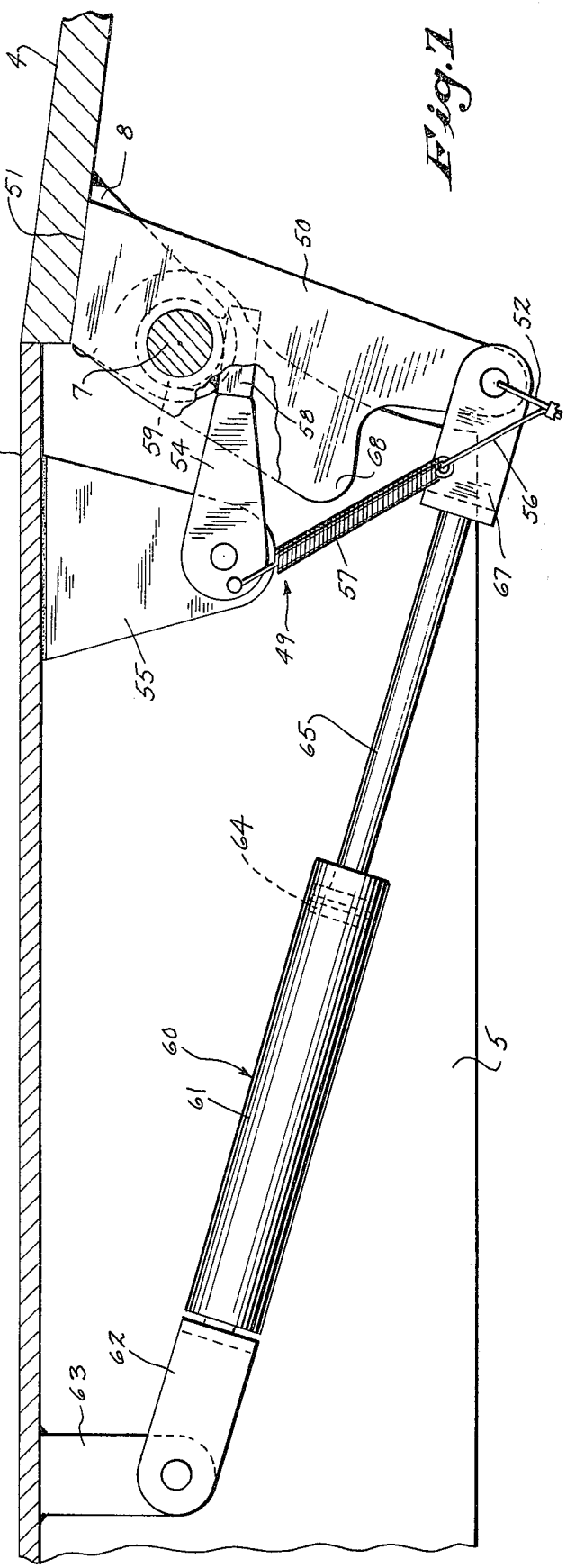

DOCKBOARD UTILIZING A GAS SPRING FOR COUNTERBALANCING

BACKGROUND OF THE INVENTION

A common form of adjustable dockboard, as disclosed in U.S. Pat. No. 3,203,002, is mounted in the pit of a loading dock and includes a ramp which is hinged at its rear edge to the frame or supporting structure and is movable between a generally horizontal cross traffic position and an upwardly extended position. Hinged to the forward edge of the ramp is a lip which is pivoted between a downwardly hanging, pendant position and an extended position where it forms an extension to the ramp. In mechanically operated dockboards of this type, a counterbalancing spring assembly is employed to bias the ramp toward the upwardly inclined position, and the operator can then walk outwardly on the ramp, and the weight of the operator, in combination with the weight of the ramp, overcomes the counterbalancing spring force so that the ramp can be lowered downwardly to bring the extended lip into engagement with the bed of a carrier located in front of the dock.

With an upwardly counterbalanced dockboard, in which the counterbalancing force is greater than the moment of the ramp about its hinge connection, a uni-directional holddown mechanism connects the ramp to the supporting structure, and while permitting free downward movement of the ramp, prevents upward movement of the ramp through the force of the counterbalancing spring, unless manually released.

The lip is pivoted to its extended position as the ramp is moved upwardly, or alternately, as the ramp is walked down, so that the lip will be in an extended position to engage the bed of a carrier as the ramp moves downwardly. In either case, a counterbalancing spring can be associated with the lip to aid in moving the lip from the pendant position toward the extended position, as described in U.S. Pat. No. 3,203,002.

In a hydraulically actuated dockboard, a hydraulic cylinder unit is connected between the ramp and the supporting structure. By supplying hydraulic fluid to the cylinder unit, the ram will be extended to pivot the ramp upwardly to the inclined position. By cutting off the supply of hydraulic fluid to the cylinder unit, the ramp will descend by gravity to bring the extended lip into engagement with the bed of the truck or carrier.

Gas springs have been used in the past to counterbalance relatively light weight items, such as tail-gates on automobiles, desk tops and the like. With the conventional gas spring, a gas such as nitrogen, is contained within the closed cylinder and a piston is mounted for sliding movement within the cylinder, with the piston rod being connected to the object to be counterbalanced. The gas spring unit provides a biasing or counterbalancing force acting to urge the piston rod to the extended position due to the differential in exposed area on opposite faces of the piston. The piston can include one or more orifices, and by including a quantity of hydraulic fluid, such as oil, in the cylinder, a cushioning effect is obtained at the ends of the stroke of travel of the piston.

SUMMARY OF THE INVENTION

The invention is directed to an adjustable dockboard utilizing a gas spring assembly for counterbalancing action. In accordance with the invention, the gas spring assembly is interconnected between a ramp and the supporting structure. The assembly includes a closed cylinder-piston unit in which the cylinder contains a gas, such as nitrogen, and a small quantity of oil. One or more orifices are provided in the piston, and as the piston moves within the cylinder, the gas and oil will pass through the orifice at a controlled rate.

When the ramp is in the horizontal cross traffic position, the piston rod will be retracted with the piston located adjacent an end of the cylinder. As the face of the piston, which is not attached to the piston rod has a greater area exposed to the fluid than that of the face of the piston to which the rod is attached, a biasing effect will be achieved which will urge the piston rod to the extended position.

A uni-directional holddown mechanism can either be associated directly with the gas spring assembly, or a separate hold-down mechanism can be used. The holddown mechanism permits free downward movement of the ramp and corresponding retraction of the piston rod, while preventing upward movement of the ramp through extension of the piston rod, unless manually released.

The oil contained within the cylinder provides a damping action at the ends of the stroke of the piston as it passes through the orifices in the piston, thereby providing a smoother, more quiet operation.

With the construction of the invention, the gas spring assembly can be connected to the front end of the ramp so that a lesser counterbalancing force is required to move the ramp to the upwardly inclined position as compared with a structure in which a counterbalancing mechanism is attached to the rear end of the ramp.

As the unit is a fully mechanical structure, no external power source is required, as is needed with a hydraulic or electromechanical type of dockboard.

With the construction of the invention, it is possible to combine the gas spring counterbalancing assembly and the holddown mechanism as a single unit. This not only reduces the number of separate parts, but as the counterbalancing mechanism and holddown are located in the same fore and aft plane, twisting moments are eliminated.

Other objects and advantages will appear in the course of the following description.

DESCRIPTION OF THE DRAWINGS

The drawings illustrate the best mode presently contemplated of carrying out the invention.

In the drawings:

FIG. 2 is a longitudinal section showing the gas spring assembly when the ramp is in the horizontal position;

FIG. 3 is a fragmentary longitudinal section showing the gas spring assembly when the ramp is in the elevated position;

FIG. 6 is a longitudinal section showing the use of the gas spring assembly in association with a lip counterbalancing mechanism with the lip shown in the pendant position; and FIG. 7 is a view similar to FIG. 5, showing the lip in the extended position.

DESCRIPTION OF THE PREFERRED EMBODIMENT

Figure 1:
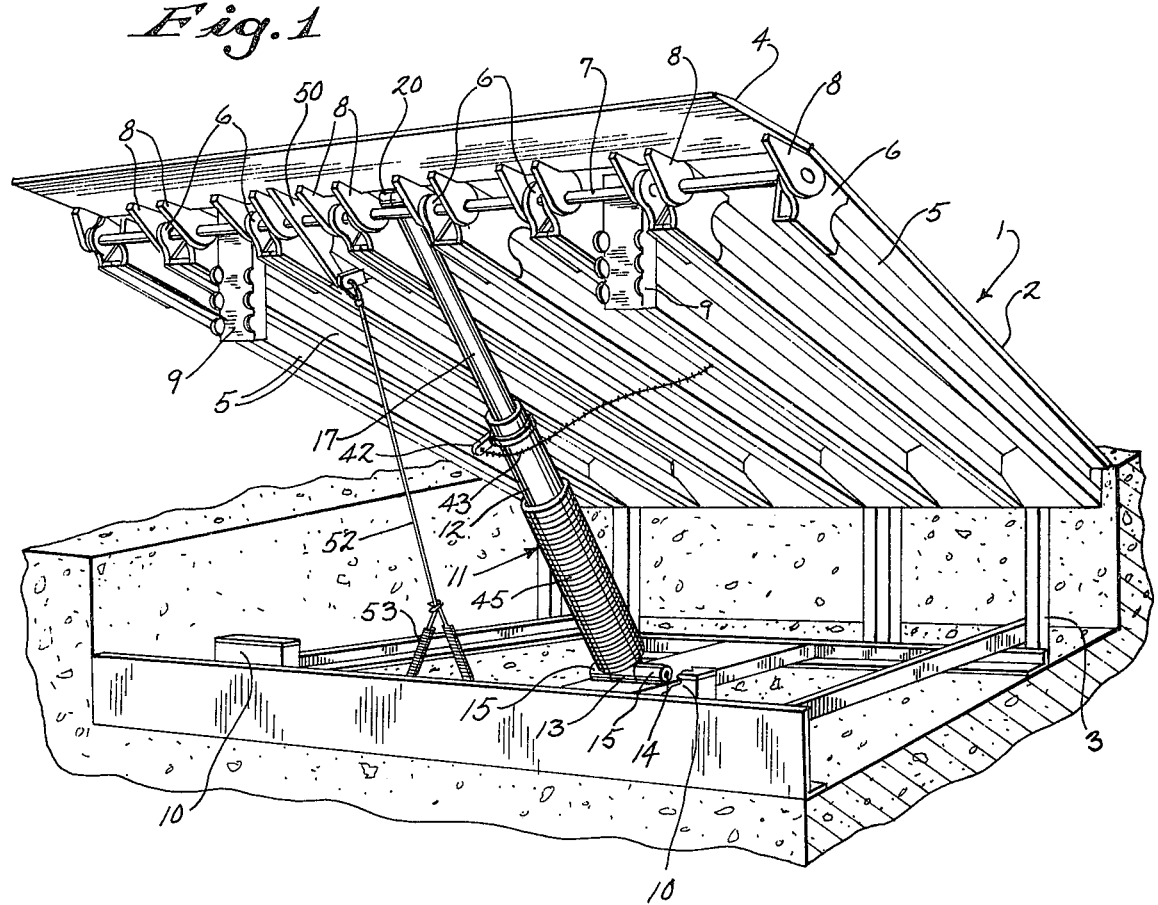
FIG. 1 is a perspective view of the dockboard incorporating the counterbalancing mechanism of the invention and with the ramp shown in the elevated position.
Figure 4:
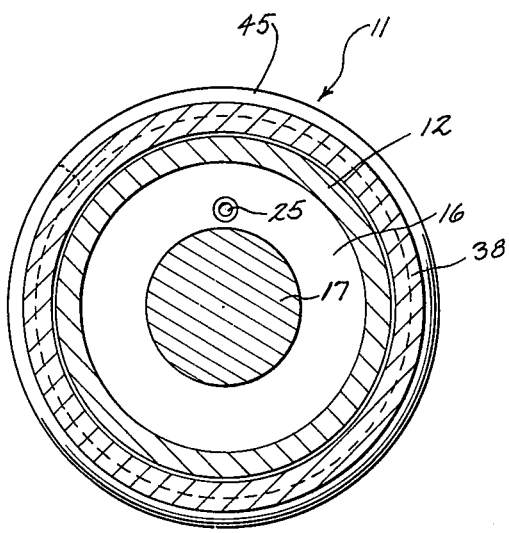
FIG. 4 is a section taken along line 4—4 of FIG. 2.
Figure 5:
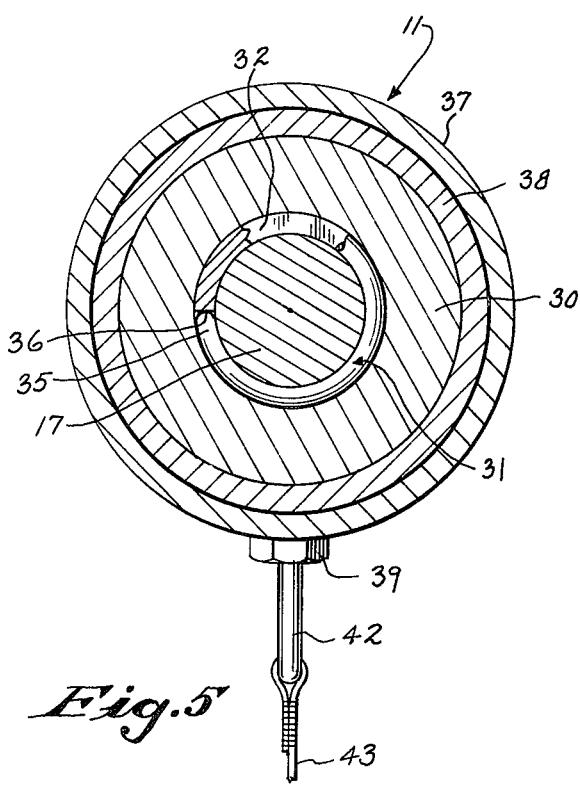
FIG. 5 is a section taken along line 5—5 of FIG. 2.

The drawings illustrate a dockboard 1 which is adapted to be mounted in a pit or depression in a loading dock. The dockboard 1 includes a ramp 2 which is hinged at its rear edge to the supporting structure or frame 3 and is movable between a generally horizontal cross traffic position and an upwardly inclined position. Attachment of the ramp to the supporting structure 3 can be similar to that disclosed in U.S. Pat. No. 3,203,002.

Hinged to the forward edge of the ramp 2 is a lip 4 which is movable between a downwardly hanging pendant position, as shown in FIG. 2 to an outwardly extending position, where the lip forms an extension to the ramp. Engagement of the rear edge of the lip with the forward edge of the ramp prevents the lip from swinging beyond the extended position.

The ramp 3 includes a series of spaced parallel beams 5, similar to that described in copending U.S. application Ser. No. 728,636, filed Oct. 1, 1976, and lugs 6 extend forward from opposite sides of the beams. Hinge pin 7 extends through openings in lugs 6 as well as aligned openings in lugs 8 that are secured to the undersurface of lip 4 to provide a hinge connection for lip 4 to ramp 2.

Pivoted to the forward edge of the ramp are a pair of legs 9 which are adapted to engage supports 10 on the frame 3 and support the ramp in either a generally horizontal cross traffic position or a series of downwardly inclined below dock level positions. The construction of the legs 9 can be similar to that disclosed in U.S. Pat. No. 3,137,017.

In accordance with the invention, a gas spring assembly 11 is connected between the supporting structure 3 and the ramp 2 and serves to bias the ramp to the upwardly inclined position, as shown in FIG. 1. The gas spring assembly 11 includes a cylinder 12 which carries a lug 13 at its lower end that is pivoted to horizontal pin 14. Pin 14 is mounted within trunions 15 on the frame 3, and this connection enables the cylinder 12 to pivot with respect to the frame or supporting structure.

Mounted for sliding movement within the closed cylinder is a piston 16, and a rod 17 is connected to the piston and extends through the upper end of the cylinder. The outer end of the rod carries a sleeve 18 which is pivoted on a pin 19 mounted within trunions 20 that are welded to the undersurface of the ramp. With this connection, the piston rod 17 can pivot with respect to the ramp.

To connect the piston rod 17 to the piston 16, the end 21 of the rod is provided with a reduced diameter and extends through an opening in the piston. A nut 22 is threaded on the end 21 of the rod and is located within a recess 23 formed in the face of the piston.

A suitable sealing ring 24 is located within a circumferential groove in the piston and serves to seal the piston with respect to the cylinder wall.

The cylinder 12 is adapted to contain a compressible fluid or gas, such as nitrogen, as well as a quantity of a liquid, such as oil. In practice, the oil may comprise from about 25% to 50% of the volume of the cylinder, with the gas constituting the remainder.

One or more restricted orifices 25 are formed in the piston 16 and as the piston moves within the cylinder, the gas and liquid will pass through the orifice.

The upper end of the cylinder 12 is closed off by a ring 26 which is secured to the cylinder by retaining ring 27. A pair of seals 28 and 29 are mounted within the ring grooves in the inner and outer surfaces, respectively, of ring 27 and provide a seal between the ring 27 and the piston rod 17 and between the ring and the cylinder wall.

Whem the lamp is in the horizontal cross traffic position, the piston rod 17 will be retracted with the piston, being located in the lower end of the cylinder 12 with the lower face of the piston 16 being spaced just slightly from the end wall of the cylinder. Due to the orifice 25 the pressure on both sides of the piston will be the same, but as the exposed area of the lower face of the piston, which is not attached to the piston rod, is considerably greater than the exposed area on the upper face of the piston which carries the piston rod 17, an upwardly directed force will be exerted against the piston tending to move the piston rod to the extended position. This force, if unrestrained, is sufficient to pivot the ramp upwardly from the horizontal position to the upwardly inclined position.

Incorporated with the gas spring assembly 11 is a holddown mechanism which permits free downward movement of the ramp and retraction of the piston rod, but prevents upward movement of the ramp and extension of the piston rod unless manually released. The holddown mechanism includes a ring 30 that surrounds the piston rod 17 and is fixed against rotation, and a torsion spring 31 is mounted within an internal groove in the ring and is held within the groove by a rotatable sleeve 32. One end 33 of the torsion spring is engaged with a notch 34 in the ring 30, while the opposite end 35 of the spring is engaged with a second notch 36 in sleeve 32. As best illustrated in FIG. 3, the notch 36 is in a plane which is generally perpendicular to the axis of the rod, while the notch 34 lies in a plane which is at an acute angle to the axis of the piston rod. The force of the torsion spring 31 produces a gripping force on the outer surface of the piston rod 17 to thereby prevent the rod from being extended under the biasing action of the fluid acting against piston 16.

To release the torsion spring from entagement with the rod 17, a collar 37 is mounted for rotation on the surface of a tube 38, which is secured to the ring 30, and the collar 37 is connected to the inner sleeve 32 by a stud 39 which extends through a hole in the collar and is threaded into the sleeve 32. As best shown in FIG. 3, the stud 39 extends through an arcuate slot 40 in the outer tube 38 and through a notch 41 in the ring 30.

Connected to the collar 37 is a lug 42 and a cable 43, or other flexible member, is attached to the end of the lug and the cable travels over pulleys and terminates in a pull ring 44 which is located in a well located in the ramp. By pulling upward on the ring 44, the collar 37 will be rotated, thereby rotating the inner sleeve 32. Rotation of the sleeve 32 will move the end 35 of the spring 31 in a direction to release the gripping force on the piston rod, thereby enabling the rod to move relative to the cylinder.

As the notch 34 is not perpendicular to the axis of the piston rod 17, the torsion spring 31 will wedge against the non-perpendicular surface to provide an increased gripping action on the piston rod and this will prevent extension of the piston rod unless the torsion spring is released through operation of the cable 43. On the other hand, the notch 36 is perpendicular to the axis of the piston rod so that no wedging action is achieved when the piston rod moves inwardly of the cylinder. Thus, the piston rod 17 can be freely retracted without release of the torsion spring. The torsion spring 31 provides a uni-directional holddown which will permit free inward movement or retraction of the piston rod, but which will prevent outward movement or extension of the piston rod, unless the torsion spring is released.

During conditions of loading, the truck bed may rise relative to the dock, as for example, when cargo is removed from the truck bed the truck springs will cause the bed to rise. In this situation, a provision is incorporated to permit the ramp to move upwardly or float with the upward movement of the truck bed, and this floating action is provided by a coil spring 45 which is engaged within grooves 46 in the tube 38, as well as in grooves 47 in the collar 48 at the lower end of the cylinder. In the event the truck bed moves upwardly, the piston rod 17, ring 30, along with the tube 38 will move upwardly as a unit against the force of the spring 45. Thus, a floating action is provided enabling the ramp to follow the upward movement of the truck bed without the necessity of releasing the gripping action of the torsion spring 31 on rod 17. If the truck bed lowers with respect to the dock, the uni-directional gripping action of torsion spring 31 will permit retraction of the piston rod to accommodate the lowering of the truck bed.

The lip is adapted to be moved from the pendant position to the extended position by a lip lifting and latching mechansim, indicated generally by 49 and which can be similar in construction to that shown in U.S. Pat. No. 3,203,002. The lip lifting mechanism includes a crank arm 50 mounted for pivoting movement on hinge pin 7. One end 51 of crank arm 50 is engaged with the underside of lip 4, while a cable or snap line 52 is attached to the opposite end of the crank arm and is connected through springs 53 to the frame 3.

When the ramp is elevated through operation of the gas spring assembly 11, the snap line 52 will become taut, and will act to pivot the crank arm 50 downwardly about hinge pin 7, thereby moving the lip 4 toward the extended position.

The lip lifting and latching mechanism 49 also includes a latch bar 54 that is pivoted to bracket 55 depending from the undersurface of ramp 3. A line or cable 56 and spring 57 connects an end of latch bar 54 to snap line 52 so that as the ramp is elevated, and snap line 52 becomes taut, line 56 will also become taut and pivot the latch bar forwardly and upwardly toward a latching position. In swinging upwardly, the lip will pivot to a fully extended position and will then fall back and be latched in a position just short of its fully extended position by engagement of latch bar 54 with lug 58, which is secured to one of the lip lugs 8 and to a collar 59 that is journalled on hinge pin 7.

To aid in moving the lip from the pendant to the extended position a lip assist mechanism is employed which includes a gas spring assembly 60 which is similar in construction to gas spring assembly 11. The gas spring assembly 60 includes a cylinder 61 having a clevis 62 at the rear end which is pivotally connected to bracket 63 which extends downwardly from the undersurface of the ramp 3. As previously described with respect to gas spring assembly 11, a piston 64 is mounted for sliding movement within the cylinder 61 and rod 65 is connected to the piston and extends outwardly of the forward end of the cylinder through an end head assembly, similar in construction to that described with respect to gas spring assembly 11. The cylinder contains a compressible gas, such as nitrogen and a quantity of oil. As previously described the piston 64 contains one or more restricted orifices 66 through which the fluids flow during movement of the piston within the cylinder.

The outer end of the rod 65 carries a celvis 67 which is pivotally connected to the rear end of crank arm 50. When the lip 4 is in the pendant position, as shown in FIG. 6, the projection 68 on crank arm 50 is engaged with the undersurface of ramp 2 to thereby maintain the axis of cylinder 60 in an in-line or slightly over-counter condition with respect to the axis of the hinge pin 7. In this condition the counterbalancing force of the gas spring assembly 60 on lip 4 will be substantially nullified.

As the ramp is moved to the upwardly inclined position through operation of the gas spring assembly 11, the snap line 52 becomes taut thereby pivoting crank arm 50 downwardly to swing the lip toward the pendant position, as shown in FIG. 7. As the crank arm is pivoted downwardly, the gas spring assembly 60 is pivoted to an under-center position, with respect to the hinge axis 7, so that the biasing force of the gas spring assembly will then be employed to aid in swinging the lip to the extended position. The biasing force of the gas spring assembly 60 is less than the moment of the lip about hinge pin 8 so that the lip, when not latched, can fall by gravity to the pendant position against the force of the gas spring assembly 60.

OPERATION

The ramp 3 is normally in a horizontal cross-traffic position, and in this position, the piston 16 of the gas spring assembly is in the lower end of the cylinder, as illustrated in FIG. 2. At this time, the counterbalancing action of the gas spring assembly will be restrained by the unilateral holding force of the torsion spring 31.

When a truck pulls in front of the dock, the operator pulls upwardly on the pull ring 44 associated with the cable 43 thereby releasing the gripping force of the torsion spring 31 and enabling the pressure differential on opposite sides of the piston 16 to move the piston rod 17 toward the extended position, thereby pivoting the ramp to the elevated position, as shown in FIG. 1.

As the ramp is elevated by the gas spring assembly 11, the cable snap line 52 will become taut, thereby pivoting the crank arm 50 downwardly to a position where the axis of the gas spring assembly 60 will be in an undercenter position, as illustrated in FIG. 7, thereby enabling the biasing force of the gas spring assembly 60 to assist in pivoting the crank arm downwardly and swinging the lip 4 forward to the extended position.

As the piston 62 approaches the upper end of the cylinder 12, the oil in the upper or forward end of the cylinder will flow through the restricted orifice 25 in the piston to create a cushioning effect and result in the upward movement of the ramp being terminated in a smooth and quiet manner.

As the snap line 52 becomes taut, the auxilliary line 56 will also tighten, thereby pivoting the latch bar 54 upwardly and forwardly to a position where it will engage the lug or projection 58, as the lip falls from the fully extended position to a position just short of the fully extended position, as shown in FIG. 7.

With the lip latched in the partially extended position, the operator then walks outwardly on the ramp and the weight of the operator in combination with the moment of the ramp about its hinge axis will overcome the counterbalancing force of the gas spring assembly 11 so that the ramp will lower until the extended lip 4 engages the bed of the truck. Upon engaging the truck bed, the lip will be pivoted to the fully extended position, thereby taking the weight of the lip off of the latch bar 54, so that the latch bar can pivot downwardly by gravity to an inoprative position. As the lip is then unlatched, the lip can fall freely by gravity to the pendant position when the trucks pulls away from the dock, and the swinging movement of the lip toward the pendant position will pivot the crank arm 50 upwardly to the position shown in FIG. 6, and cause the piston rod 65 to move to the retracted position. As the piston approaches the rear end of the cylinder, the oil contained within the cylinder will pass through the orifice 66 of the piston 64 thereby providing a damping action to cushion the return of the lip to the pendant position.

By attaching the gas spring assembly 11 to the front of the ramp, rather than the rear, a lesser counterbalancing force is required to move the ramp to the elevated position.

The gas spring assembly 11 requires no outside power source as is required in hydraulic or electromechanical dockboards. This substantially reduces the operating cost of the dockboard.

By incorporating a quantity of a hydraulic fluid, such as oil, in the cylinders of both gas spring assemblies 11 and 60, a smoother and more quieter action is obtained due to the damping effect as the oil passes through the restrictive orifice in the piston at the ends of the stroke of travel of the piston.

While the above description has shown the holddown mechanism, such as torsion spring 31, associated with the gas spring assembly, it is contemplated that a separate holddown mechanism, such as disclosed in U.S. Pat. No. 3,646,627, can be utilized. However, incorporating the holddown mechanism with the gas spring assembly, as specifically shown in FIG. 2, provides an advantage in that a fewer number of moving parts are required, and as both units lie in the same fore-to-aft plane, twisting of the ramp during operation is minimized.

Various modes of carrying out the invention are contemplated as being within the scope of the following claims particularly pointing out and distinctly claiming the subject matter which is regarded as the invention.

I claim:

1. In a dockboard, a supporting structure, a ramp structure hinged at its rear edge to the supporting structure and movable between a generally horizontal cross traffic position and an upwardly inclined position, and a gas spring assembly operably interconnecting the supporting structure and the ramp structure and exerting a biasing force to urge the ramp structure toward the upwardly inclined position, said gas spring assembly including a cylinder pivotally connected to one of said structures and containing a compressible gas, a piston mounted for sliding movement within said cylinder, a piston rod connected to the piston and extending through an end of the cylinder and pivotally connected to the other of said structures, the force differential exerted on opposite faces of said piston by said gas producing a counterbalancing force to urge the ramp structure to the upwardly inclined position, and orifice means extending through the piston to permit gas to flow through said piston when said piston moves within said cylinder.

2. The dockboard of claim 1, and including releasible holddown means operably connected to the ramp structure and having a locked position and a released position, said holddown means when in the locked position permitting free downward movement of the ramp structure from the inclined position to the horizontal position and corresponding retraction of said piston rod with respect to said cylinder and said holddown means when in the locked position preventing upward movement of the ramp structure and extension of said piston rod unless released, and release means operably connected to the holddown means for moving said holddown means from the locked position to the released position.

3. The dockboard of claim 1, wherein said gas spring assembly is connected to the forward edge portion of the ramp structure.

4. The dockboard of claim 1, wherein said cylinder also contains a substantial quantity of a liquid.

5. The dockboard of claim 4, wherein said liquid comprises from about 25% to 50% of the volume of said cylinder.

6. The dockboard of claim 2, wherein said holddown means comprises a torsion spring disposed around the outer end of said piston rod and exerting a force to grip said piston rod and lock the piston rod against extension, said release means being operably connected to said torsion spring for releasing the gripping force of said torsion spring on said piston rod.

7. The dockboard of claim 6, and including a ring disposed axially of the cylinder and surrounding the outer end of the piston rod, one end of the torsion spring being engaged with said ring, a rotatable collar mounted for rotation with respect to the ring, the opposite end of the torsion spring being engaged with said rod, said release means being connected to said collar whereby actuation of said release means will rotate said collar to release the gripping force of said torsion spring on said piston rod.

8. The dockboard of claim 7, and including resilient means interconnecting the ring and the cylinder, the ring and the piston rod being disposed for limited outward movement relative to the cylinder against the force of said resilient means when the holddown means is in the locked position to accommodate variations in height between the dock and the bed of a carrier during the loading operation.

9. The dockboard of claim 8, wherein said resilient means comprises a coil spring surrounding the cylinder and having one end connected to the cylinder and the other end connected to the ring.

10. The dockboard of claim 2, and including resilient means for affecting limited extension of the piston rod when the holddown means is in the locked position to accommodate variations in height between the dock and the bed of a carrier during the loading operation.

11. A dockboard to be mounted on a loading dock and adapted to bridge the gap between the dock and the bed of a carrier disposed in front of the dock, comprising a supporting structure, a ramp structure hinged at its rear edge to the supporting structure and movable between a generally horizontal cross traffic position and an upwardly inclined position, a gas spring assembly interconnecting the supporting structure and the ramp structure, said gas spring assembly including a closed cylinder pivotally connected to one of said structures and containing a compressible gas and containing a quantity of a liquid, a piston mounted for sliding movement within the cylinder, a piston rod connected to the piston and projecting through an end of the cylinder and pivotally connected to the other of said structures, orifice means disposed in said piston for permitting passage of said gas and said liquid through said piston as said piston moves within said cylinder, the differential in force acting against opposite faces of the piston through said fluid urging the piston rod to an extended position relative to the cylinder and thereby biasing the ramp structure to the upwardly inclined position, manually releasable uni-directional holddown means operably connected to the projecting end of said piston rod and movable between a locked position and a released position, said holddown means when in the locked position preventing extension of said piston rod but permitting free retraction of said piston rod, and said holddown means when in the released position permitting both free extension and retraction of said piston rod, and resilient means operably connected to the projecting end of said piston rod for permitting limited extension of said piston rod when said holddown means is in the locked position in order to accommodate variations in height between the dock and the bed of the carrier during the loading operation.

12. The dockboard of claim 11, wherein the holddown means is connected to the cylinder by said resilient means whereby said holddown means when in the locked position and said piston rod can move relative to said cylinder against the force of said resilient means.

13. In a dockboard, a supporting structure, a ramp member hinged at its rear edge to the supporting structure and movable between a generally horizontal cross traffic position and an upwardly inclined position, a lip hinged to the forward edge of the ramp member about a hinge axis and movable between a downwardly hanging pendant position and an extended position, elevating means operably connecting the supporting structure and the ramp member for moving the ramp member to its upwardly inclined position, a gas spring assembly operably connected between the ramp member and the lip for counterbalancing a portion of the gravity produced moment of the lip about the hinge axis, a crank member mounted for pivotal movement about said hinge axis and engaged with the undersurface of the lip, said gas spring assembly including a cylinder pivotally connected to one of said members and containing a quantity of a compressible fluid and a quantity of a substantially incompressible fluid, a piston mounted for sliding movement within the cylinder, orifice means disposed in the piston whereby the fluids can pass through the piston on movement of said piston within the cylinder, a piston rod connected to the piston and extending outwardly of said cylinder and pivotally connected to the other of said members, the force differential on opposite faces of said piston acting to bias the piston rod to an extended position, the axis of said cylinder being in substantial alignment with the hinge axis when the lip is in the pendant position, means responsive to upward movement of the ramp member for moving the crank member downwardly and moving the axis of said cylinder to an undercenter position with respect to said hinge axis, whereby the biasing force of said gas spring assembly will act through said crank member to assist in moving the lip toward the extended position.

14. In a dockboard, a supporting structure, a ramp member hinged at its rear edge to the supporting structure and movable between a generally horizontal cross traffic position and an upwardly inclined position, a lip hinged to the forward edge of the ramp member on a hinge axis and movable between a downwardly hanging pendant position and an extended position, elevating means operably connected to the ramp member for moving the ramp member to its upwardly inclined position, an arm member engaged with the undersurface of the lip and mounted for movement with respect to said hinge axis, a gas spring assembly including a cylinder pivotally connected to one of said members and containing a quantity of a compressible gas, a piston mounted for sliding movement within the cylinder, orifice means disposed in the piston whereby the gas can pass through the piston on movement of said piston within the cylinder, a piston rod connected to the piston and extending outward of said cylinder and pivotally connected to the other of said members, the force differential on opposite faces of said piston acting to bias the piston rod to an extended position, the axis of said cylinder being arranged relative to the hinge axis when the lip is in the pendant position such that the biasing force of said gas spring assembly is substantially nullified, means for swinging the lip from the pendant position toward the extended position and for moving the axis of said cylinder to an undercenter position with respect to said hinge axis, whereby the biasing force of said gas spring assembly will act through said arm to assist in moving the lip toward the extended position.

15. The dockboard of claim 14, wherein the cylinder also contains a quantity of a substantially incompressible liquid, passage of said liquid through said orifice means as said piston moves within the cylinder providing a cushioning effect for movement of said lip.

* * * * *

UNITED STATES PATENT AND TRADEMARK OFFICE
CERTIFICATE OF CORRECTION

PATENT NO. : 4,091,488
DATED : May 30, 1978
INVENTOR(S) : THOMAS G. ARTZBERGER

It is certified that error appears in the above-identified patent and that said Letters Patent are hereby corrected as shown below:

Column 6, Line 11, Cancel "over-counter" and substitute therefor ---over-center---, Column 6, Line 48, Cancel "underc" and substitute therefor ---under- ---, Column 6, Line 49, Cancel "enter" and substitute therefor ---center---, Column 6, Line 53, Cancel "piston 62" and substitute therefor ---piston 16---.

Signed and Sealed this

Twenty-seventh Day of February 1979

[SEAL]

Attest:

RUTH C. MASON
Attesting Officer

DONALD W. BANNER
Commissioner of Patents and Trademarks